United States Patent Office

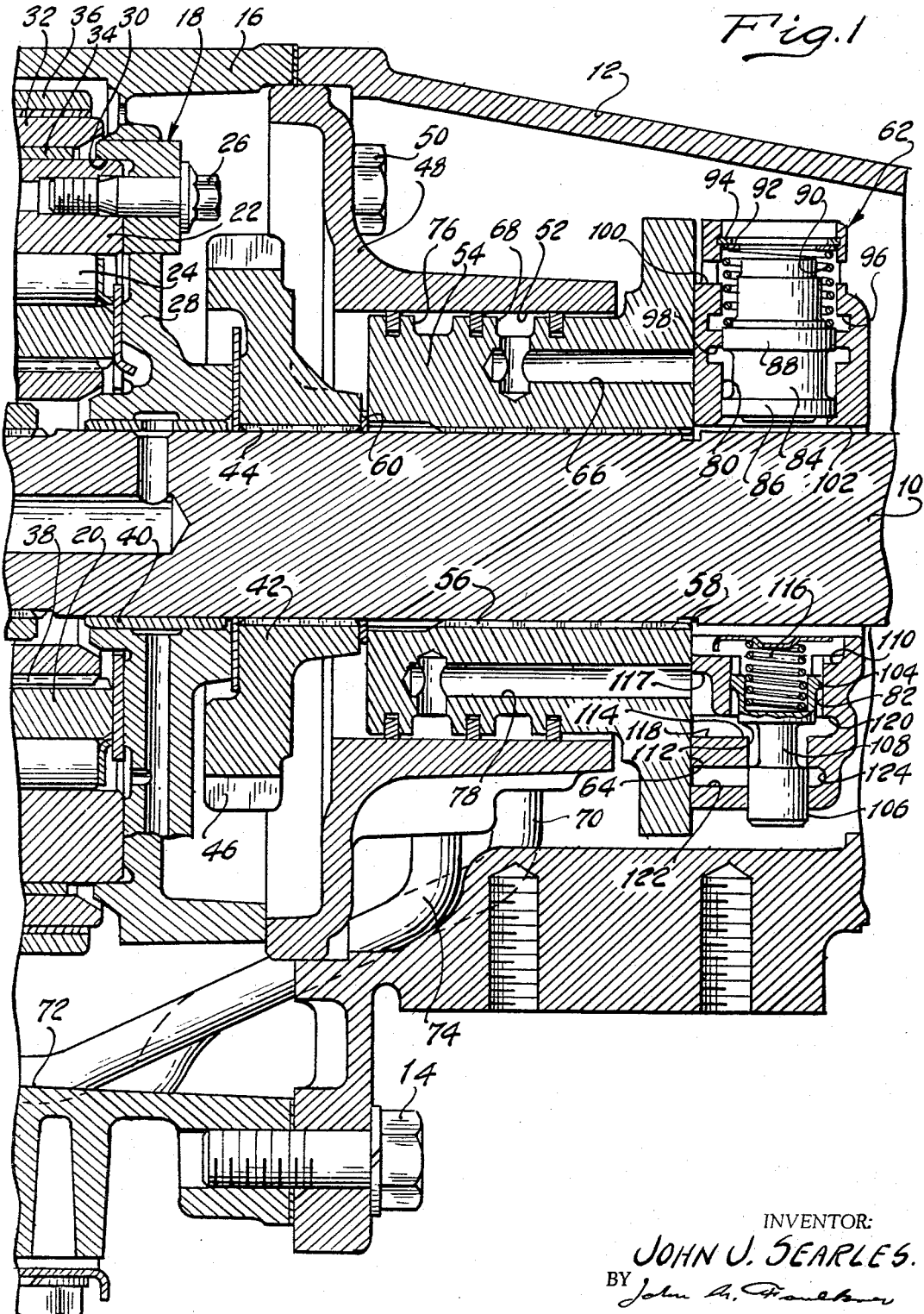

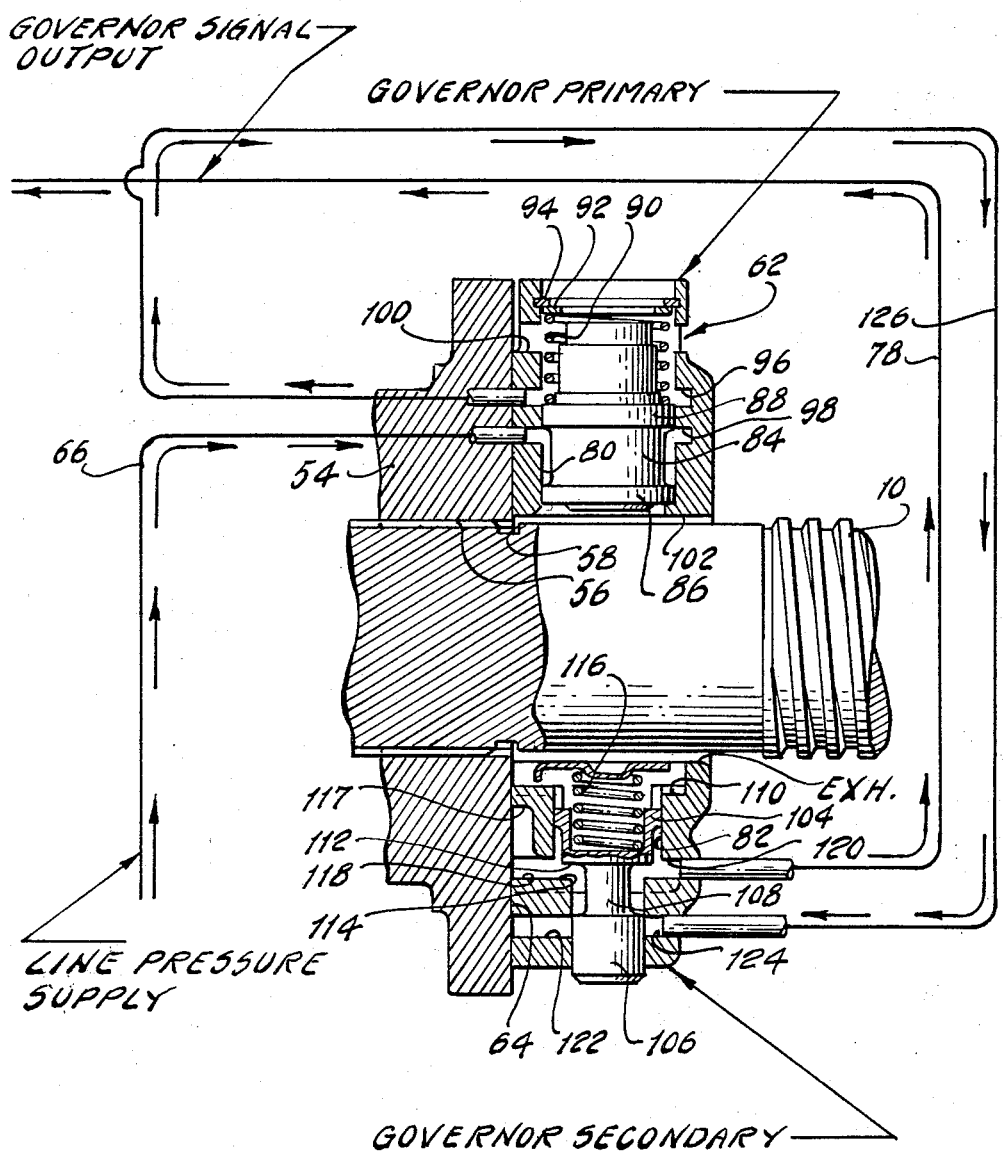

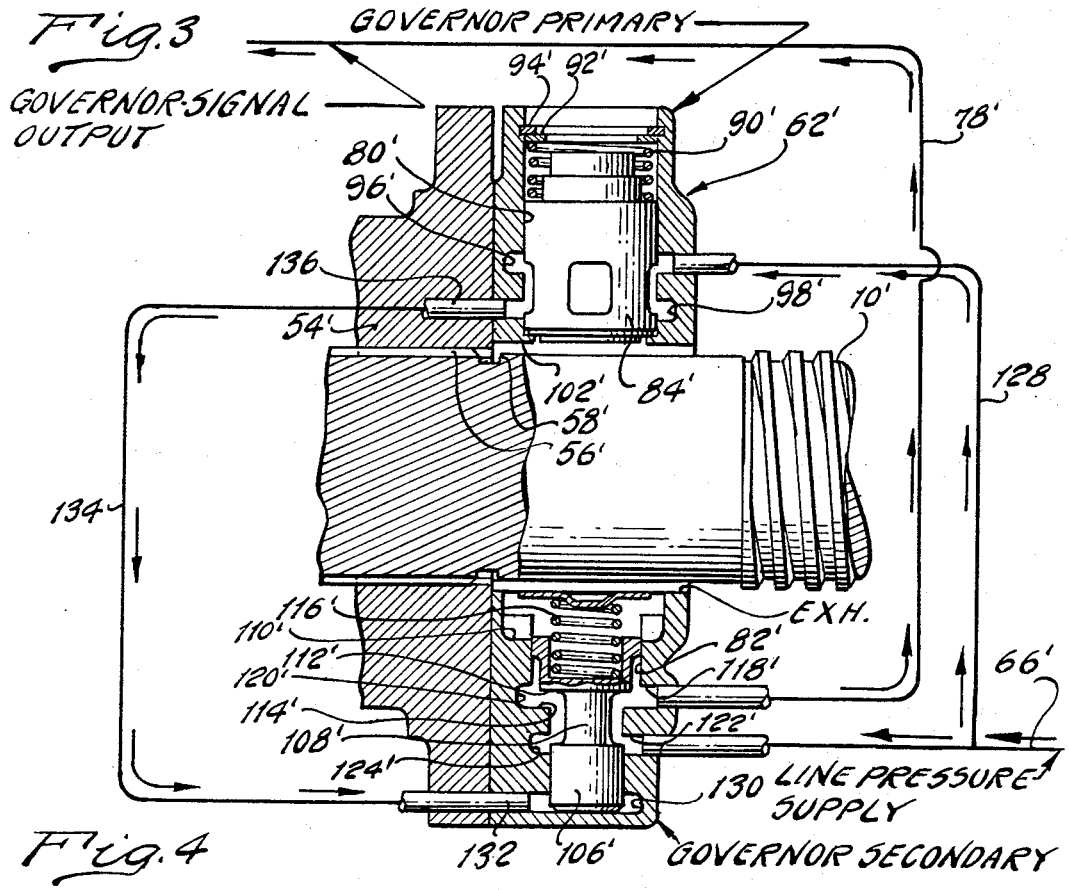
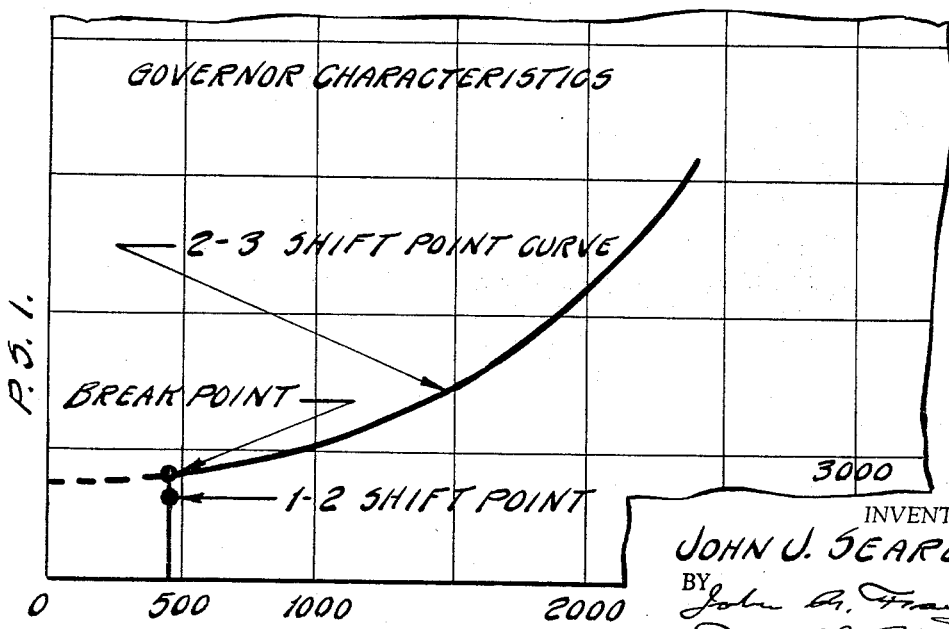

3,322,133
Patented May 30, 1967

3,322,133
COMPOUND FLUID PRESSURE GOVERNOR
VALVE ASSEMBLY
John J. Searles, Garden City, Mich., assignor to Ford
Motor Company, Dearborn, Mich., a corporation of
Delaware
Filed Dec. 14, 1964, Ser. No. 418,085
8 Claims. (Cl. 137—56)

My invention relates generally to control valve systems in which a variable fluid pressure signal is used to initiate automatic control functions. More particularly, my invention relates to a compound governor valve assembly for producing a pressure signal that may be utilized by an automatic control valve system in a power transmission mechanism for an automotive vehicle driveline.

The improvements of my invention can be adapted readily to an automatic control valve system of the type shown in my copending application, Serial Number 397,-798, which is assigned to the assignee of my invention. In the control system of that copending disclosure there is provided fluid pressure operated clutch and brake servos that control the relative motion of planetary gear elements of a multiple speed ratio gear system. A fluid pressure source in the form of a positive displacement pump is drivably connected to the vehicle engine. The control valve system is defined in part by conduit structure that interconnects the pump and the fluid pressure operated servos. A fluid pressure regulator valve of the bypass flow type communicates with the conduit structure for maintaining a desired pressure level in the control system. Distributor valve means for initiating speed ratio changes are situated in the conduit structure to control distribution of the pressure that is regulated by the regulator valve to each of the several servos.

Provision is made for regulating the pressure level of the control system in order that it might meet changing torque delivery requirements. This is done by using in the system a primary throttle valve that is sensitive to engine intake manifold pressure. The throttle valve produces a pressure signal that is proportional in magnitude to engine torque. This signal is distributed to the regulator valve means for changing its operating pressure level as the engine torque itself changes.

In the transmission of my copending disclosure, there is included a hydrokinetic torque converter that is situated between the gear system and the engine. The torque converter multiplies engine torque before it is transferred through the torque delivery paths of the gear system. Thus, the torque delivery requirements of the servos increase as the hydrokinetic torque ratio of the torque converter increases. After the hydrokinetic torque ratio is reduced upon an increase in the overall speed ratio, the torque delivery requirement of the gear system is reduced, although a corresponding reduction in engine torque may not take place. In order to provide the required reduction in the regulated pressure level under these conditions, there is included in the control valve system of that copending disclosure a cut-back valve that responds to a vehicle speed signal. When the magnitude of the speed signal reaches a predetermined value for any given value of the manifold pressure, the cut-back valve responds to distribute the torque signal pressure to the regulator valve thereby modifying the regulated system pressure.

The same speed signal that is distributed to the cut-back valve is distributed also to the fluid pressure distributor valve to initiate the speed ratio changes. If three or four forward driving speed ratios are required, at least two ratio changes must take place before the highest speed ratio is achieved. It is desirable to provide the necessary degree of sensitivity of the governor pressure signal to changes in engine speed when the control system is called upon to initiate a speed ratio change to the highest speed ratio. Thus, the characteristics of the governor valve assembly must be such that the shift point characteristics of the fluid pressure distributor valves are favorable.

Since the governor valve assembly must provide also an adequate signal for initiating a line pressure cut-back during the first speed ratio change from the lowest speed ratio to an intermediate speed ratio, the output pressure characteristics of the governor valve assembly itself must be different at lower speeds than they are at speeds at which the last upshift occurs. It is desirable, therefore, to provide a governor valve assembly that is capable of modulating the supply pressure to produce a resultant pressure having a high degree of sensitivity at higher vehicle speeds and wherein the pressure modulating action is inhibited at lower vehicle speeds.

One governor valve assembly that will provide such an output pressure characteristic is shown in U.S. Patent 3,048,184, which is assigned also to the assignee of my instant invention. In that governor valve assembly, there are provided a primary governor valve and a secondary governor valve, with the secondary governor valve being supplied with control pressure. The secondary governor valve includes a governor pressure outlet port and an exhaust port as well as a control pressure supply port. The primary governor valve is in fluid communication with the exhaust port and is capable of blocking the exhaust port. When the speed of the power output shaft is less than a predetermined value, the primary governor valve is actuated under the influence of centrifugal force against the opposing influence of a spring. As the power output shaft speed reaches a predetermined value, the primary governor valve opens the exhaust port for the secondary governor valve thereby permitting the latter to modulate the control pressure to produce a resultant signal in the output pressure port that can be used by the control valve system. The pressure build-up that occurs in the exhaust port is determined by leakage across the lands of the secondary governor valve element.

In my improved governor valve assembly, I provide the necessary speed-pressure characteristics without the necessity for relying upon leakage to obtain the inhibiting action necessary to achieve a break-point in the output pressure-speed characteristic curve. In my improved governor valve assembly, I have made provision also for eliminating excessive loss of fluid from the control valve system due to leakage. The provision of an improved governor valve assembly having these design characteristics is an object of my invention.

It is a further object of my invention to provide a compound governor valve assembly for use in an environment of the type above set forth, and which is characterized by a pressure signal that varies in a reliable fashion with changes in the speed of the driven member. I contemplate that the signal thus obtained can be utilized by an automatic control valve system to produce uniform shift points in a multiple speed ratio power transmission mechanism.

It is a further object of my invention to provide a governor valve assembly of the type above set forth and which is characterized further by its dynamic stability and its design simplicity.

In carrying forth the foregoing objects, I have provided a governor valve assembly having a primary governor and a secondary governor as described in the foregoing paragraphs. In one embodiment of my invention, control pressure is distributed initially to the primary governor which blocks a pressure distributing feed passage that extends to the secondary governor. The governor pressure passage communicates with the secondary governor as does an exhaust port. Thus, the secondary governor is capable of producing a modulated pressure signal in response to changes in centrifugal force acting upon it whenever the primary governor is positioned to establish communication between the control pressure source and the secondary governor. It is adapted to do this whenever the speed of rotation of the driven member is greater than a predetermined value. At any speed less than that value, however, the control pressure supplied to the secondary governor is interrupted. Thus the output pressure signal of the governor output assembly is zero. The only flow loss in an arrangement of this type is that which is due to the modulation of the secondary governor valve element during operation in the high-speed range.

A second embodiment of my invention produces a characteristic that is similar to that produced by the first embodiment, although the primary governor functions to distribute control pressure to the fluid pressure area on a secondary governor valve to render the latter incapable of modulating the pressure that is supplied by the secondary governor valve feed passage. At speeds greater than a predetermined value, however, the primary governor valve responds to exhaust the pressure area of the secondary governor valve and to block further distribution of pressure to the secondary governor valve element through the primary governor valve, although control pressure continues to be made available to the feed passage for the secondary governor valve. Thus the secondary governor valve can modulate the control pressure whenever the speed of rotation of the driven member is greater than a predetermined design value. Again, the only flow loss in this arrangement is that which is due to modulation of the control pressure during operation at high speeds. Neither embodiment of my invention depends for its successful operation upon leakage across a valve land.

For the purpose of describing more particularly the improvements of my invention, reference will be made to the accompanying drawings, wherein:

FIGURE 1 shows in longitudinal cross-sectional form my improved governor valve assembly mounted in the tailshaft portion of a power transmission mechanism for an automotive vehicle driveline;

FIGURE 2 shows in schematic form the hydraulic circuitry for the governor valve assembly of FIGURE 1;

FIGURE 3 shows in schematic form the hydraulic circuitry for a second embodiment of my invention; and FIGURE 4 is a chart showing the governor characteristics for each of the two embodiments shown in FIGURES 1, 2 and 3.

In FIGURE 1, numeral 10 designates a power output shaft of a multiple speed ratio, power transmission mechanism. It is enclosed within a tailshaft extension housing 12 which is bolted by means of bolts 14 to a flanged end of a main power transmission housing 16. This housing is adapted to enclose planetary gearing, a portion of which is shown generally at 18. This planetary gearing may be similar to that shown in my copending application, Serial Number 397,798, to which reference may be had for the purpose of supplementing this disclosure.

Gearing 18 includes an overrunning reaction brake that comprises an inner race 20, an outer race 22 and overrunning coupling elements in the form of rollers 24. The race 22 can be formed with cam recesses that register with the rollers 24 to provide one-way braking action for the inner race 20. Freewheeling motion of the race 20 in a direction opposite to the direction of delivery of reaction torque can be accommodated.

The outer race 22 is bolted by means of bolts 26 to a wall 28, which is connected directly to the transmission housing 16. A pilot shoulder 30 is formed on the wall 28 for the purpose of piloting the outer race 22 and for providing added support. A brake drum 32, which is connected to the carrier of a compound planetary gear system, is journalled by means of a bushing 34 upon the outer periphery of the race 22. A brake band 36 surrounds drum 32, and it may be applied in the usual fashion by means of a fluid pressure operated servo. This provides a torque reaction delivery path for the planetary gear system regardless of the direction of reaction torque delivery. Overrunning brake 24, however, is capable of delivering reaction torque to the transmission housing during forward drive operation under torque.

In the embodiment shown in application Serial Number 397,798, the planetary carrier is splined as shown at 38 to the inner race 20.

Wall 28 is formed with an opening through which the shaft 10 extends. Shaft 10 is journalled in this opening by bushing 40.

A parking gear 42 is splined at 44 to the shaft 10. It has teeth on its periphery, as shown at 46, which are adapted to be engaged by a parking pawl that is under the control of the vehicle operator. The pawl in turn is anchored to the housing 16.

A governor manifold sleeve member 48 is bolted by means of bolts 50 to the wall 28 and the housing 16. It is formed with a sleeve extension having a cylindrical opening 52 within which a cylindrical fluid pressure distributor manifold 54 is situated. This manifold is splined at 56 to the shaft 10 and rotates with it. The right-hand end of the manifold 54 engages a shoulder 58 formed on the shaft 10 at the right-hand end of the splines 56. The left-hand end of the manifold 54 is separated from the parking gear 42 by means of a spacer 60.

A governor valve body 62 is bolted to the right-hand radial surface 64 of the manifold 54. Suitable bolts, not shown, can be provided for this purpose.

Manifold 54 is provided with a control pressure feed passage 66. This passage extends axially and communicates with an annular groove 68 formed in the manifold 54. Groove 68 in turn communicates with a control pressure supply passage 70 which extends through the sleeve for member 48. Passage 70 communicates with an automatic control valve body, not shown, which is situated in the lower sump region 72 of the housing 16. A governor pressure passage 74 extends from the valve body and through a port in the sleeve for member 48. It communicates with an annular groove 76, which in turn is in fluid communication with an axially positioned internal passage 78 formed in the manifold 54. Passage 66 functions to distribute control pressure to the governor valve body 62, and the passage 78 functions to distribute governor pressure from the governor valve body 62 to the control valve body located in the transmission sump region.

The governor valve body 62 is formed with a pair of valve chambers which are identified by reference characters 80 and 82. Valve chamber 80 receives a primary governor valve element 84 which is formed with a pair of spaced valve lands 86 and 88. These lands register with cooperating internal valve lands formed in the chamber 80. A valve spring 90 acts upon the land 88 seated upon a thrust washer 92 which is held in place in the chamber 80 by means of a snap ring 94.

Annular grooves 96 and 98 are situated on either radial side of the valve land 88. An exhaust port 100 is formed in the radially outward portion of chamber 80.

When the valve element 84 assumes the position shown, communication is established between groove 96 and the exhaust port 100. At the same time communication between grooves 96 and 98 is interrupted.

The spring 90 is effective to hold the valve element 84 in the position shown at any tailshaft speed that is less than a predetermined design value, such as 400 r.p.m. When the speed exceeds that predetermined design value, however, the centrifugal force that is due to the mass of the element 84 urges the element 84 in a radially outward direction against the opposing influence of spring 90 thereby interrupting communication between groove 96 and exhaust port 100 while establishing communication between groove 96 and groove 98.

The radially inward end of the chamber 80 is in fluid communication with an exhaust passage 102.

Groove 98 is in fluid communication with control pressure passage 66 through internal porting in the valve body 62 not shown.

The valve chamber 82 is displaced 180° out of phase with respect to the valve chamber 80. It includes a large diameter portion within which is received a large diameter valve land 104. It includes also a smaller diameter portion that receives a smaller diameter valve land 106. Valve lands 104 and 106 form a part of a secondary governor valve element 108.

Valve lands 104 and 106 register with cooperating internal valve lands formed in the chamber 82. An exhaust groove 110 is formed at the radially inward end of the chamber 82.

The lower end 112 of land 104 is adapted to engage the end 114 of the cooperating internal valve land formed in the chamber 82. When the element 108 is in a non-operative, at rest condition, a valve spring 116 normally urges the valve element 108 in a radially outward direction.

The radially inward end of valve element 108 can be bored for receiving the spring 116 thereby providing space for a spring of necessary length without the necessity for increasing the radial dimensions of the valve assembly.

The governor pressure passage communicates with a governor pressure port 118 formed in the element body 62. Port 118 communicates with an annular groove 120 formed in the secondary valve chamber 82 at a location adjacent land 104. Communication between passage 78 and port 118 is established by a radially extending recess 117 formed in the left end surface of valve body 62. Another port 122 communicates with an annular groove 124 formed in the reduced diameter, annular portion of the chamber 82 at a location adjacent the land 106. As seen in FIGURE 2, port 122 communicates with groove 96 formed in the primary governor valve chamber 80. This communication is established by a cross-over passage 126 which may be formed in the valve body 82.

During operation of the mechanism of FIGURES 1 and 2, pressure is supplied continuously to the primary governor. When the governor valve element 84 assumes the position shown, however, the secondary governor valve is starved and is not capable of producing a speed signal. When the governor breakpoint speed is reached, the valve element 84 shifts outwardly due to the centrifugal force acting upon it thereby establishing communication between passages 66 and 126.

The pressure thus distributed to passage 126 acts upon the differential area of the lands 106 and 104 of the primary governor valve element 108. This produces a pressure force that opposes the force of spring 116. The valve 108 will then be able to modulate the pressure made available to it by passage 126 and produce a resultant pressure in passage 78. As the centrifugal force acting upon the valve element 108 increases, the communication between passages 126 and 78 increases and communication between passage 78 and the exhaust groove 110 is decreased. Thus the pressure signal in passage 78 is an indicator of the speed of shaft 10 at any speed in excess of the breakpoint speed. A representation of the governor characteristics for the structure of FIGURES 1 and 2 is indicated in FIGURE 4.

In FIGURE 3 I have indicated another governor construction that is capable of producing the characteristics illustrated in FIGURE 4. Like the construction of FIGURES 1 and 2, this construction comprises a primary governor and a secondary governor. Each of the governors includes a governor valve element that has a counterpart element in the structure of FIGURES 1 and 2. For this reason the elements of FIGURE 3 bear the same reference notations as the corresponding elements of FIGURES 1 and 2, although prime notations have been added.

In the FIGURE 3 construction control pressure passage 66 is in continuous fluid communication with the cross-over passage 128, which extends in turn to groove 96' formed in the primary governor valve chamber 80'.

The radially outward end of the secondary governor valve chamber 82' is closed and the radially outward surface of the land 106' is in fluid communication with an annular groove 130. A fluid pressure port 132 communicates with the groove 130 and also with a second cross-over passage 134, which is formed in the valve body 62'.

The annular groove 98' formed in the primary governor valve chamber 80 is in fluid communication with a port 136, which is connected to the passage 134.

When the valve element 84' is in the position shown, the valve chamber 80 establishes fluid communication between the passages 128 and 134. Thus, control pressure is distributed initially to the radially outward end of the secondary governor valve land 106', which tends to urge the secondary governor valve element 108' radially inwardly against the opposing influence on the valve spring 116'. As long as the pressure in passage 132 is present, valve element 108' thus is inhibited from modulating the pressure in passage 66'. At the same time governor pressure passage 78' is in continuous communication with the exhaust port shown in part at 110'. Thus, whenever the speed of rotation is less than that value that will cause the valve element 84' to shift radially outwardly, the governor pressure made available to the control system is of zero magnitude.

At a predetermined breakpoint speed the valve element 84' will shift radially outwardly against the opposing influence of valve spring 90' thereby interrupting communication between passages 128 and 134 and exhausting passage 134 through exhaust passage 102'. This immediately relieves the pressure acting upon the radially outward end of the valve land 106 of the secondary governor valve element 106'. Thereafter the valve element 108' can modulate the pressure in passage 166' to produce a resultant pressure signal in passage 78' that is an indicator of the driven speed of rotation of the shaft 10.

As in the embodiment of FIGURES 1 and 2, the construction of FIGURE 3 is void of leakage except that leakage which is due to normal modulation of valve element 108'.

Having thus described preferred embodiments of my invention, what I claim and desire to secure by United States Letters Patent is:

1. In a compound fluid pressure governor adapted to establish a pressure signal that is an indicator of the driven speed of a driven member, a valve body mounted for rotation with said driven member, a first valve chamber and a second valve chamber formed in said valve body, a primary governor valve element and a secondary governor valve element disposed respectively in said first and second valve chambers and adapted for radial shifting movement with respect to the axis of rotation of said driven member, a fluid pressure supply passage in fluid communication with said governor assembly, a governor pressure delivery passage communicating with said secondary valve chamber, said secondary governor valve element being formed with a differential area that is in fluid communication with said delivery passage, each valve element being adapted to be urged radially outwardly under the influence of centrifugal force, said secondary governor valve element being adapted to modulate the control pressure made available to said assembly to produce a resultant pressure signal in said governor pressure delivery passage that is proportional in magnitude to the driven speed of said driven member, a cross-over passage interconnecting portions of said primary governor valve chamber and portions of said secondary governor valve chamber whereby said primary governor valve element may influence the regulating characteristics of said secondary governor valve element by controlling distribution of pressure to said cross-over passage, and means for opposing radially outward movement of said primary governor valve element under the influence of centrifugal force, said primary governor valve element being adapted to establish distribution of control pressure through said primary governor valve chamber to said cross-over passage when it assumes one radial position and to exhaust said cross-over passage when it assumes another radial position.

2. In a compound fluid pressure governor adapted to establish a pressure signal that is an indicator of the driven speed of a driven member, a valve body mounted for rotation with said driven member, a first valve chamber and a second valve chamber formed in said valve body, a primary governor valve element and a secondary governor valve element disposed respectively in said first and second valve chambers and adapted for radial shifting movement with respect to the axis of rotation of said driven member, a fluid pressure supply passage in fluid communication with said governor assembly, a governor pressure delivery passage communicating with said secondary valve chamber, said secondary governor valve element being formed with a differential area that is in fluid communication with said delivery passage, each valve element being adapted to be urged radially outwardly under the influence of centrifugl force, said secondary governor valve element being adapted to modulate the control pressure made available to said assembly to produce a resultant pressure signal in said governor pressure delivery passage that is proportional in magnitude to the driven speed of said driven member, a cross-over passage interconnecting portions of said primary governor valve chamber and portions of said secondary governor valve chamber whereby said primary governor valve element may influence the regulating characteristics of said secondary governor valve element by controlling distribution of pressure to said cross-over passage, means for opposing radially outward movement of said primary governor valve element under the influence of centrifugal force, said primary governor valve element being adapted to establish distribution of control pressure through said primary governor valve chamber to said cross-over passage when it assumes one radial position and to exhaust said cross-over passage when it assumes another radial position, and a valve spring situated on the radially inward side of said secondary governor valve element for urging the latter in a radially outward direction.

3. In a compound governor valve assembly for use in establishing a pressure signal that is proportional in magnitude to the driven speed of a driven member, a valve body mounted upon said member and including therein a primary valve chamber and a secondary valve chamber, a primary valve element and a seconday valve element disposed respectively in said primary and secondary valve chambers, said secondary valve element having formed thereon a differential area, a control pressure passage means communicating with each valve chamber for distributing thereto a supply pressure, a cross-over passage communicating with each valve chamber, a governor pressure passage communicating with said secondary valve chamber at a location adjacent said differential area, an exhaust port formed in each valve chamber, said primary governor valve element being adapted to assume either of two radial positions, spring means for biasing said primary governor valve element radially inwardly whereby it is adapted to establish communication between said supply pressure passage and said cross-over passage, said primary valve element being moved outwardly under the influence of centrifugal force when the speed of rotation of said driven member reaches a predetermined value whereby it is adapted to establish communication between said cross-over passage and its associated exhaust port, said secondary governor valve element being adapted to modulate the pressure of said control pressure passage when said cross-over passage is exhausted thereby producing a resultant pressure signal in said governor pressure passage that is proportional in magnitude to the driven speed of said driven member, and a pressure area on said secondary governor valve element that is in communication with said cross-over passage, the pressure in said cross-over passage, when the latter is in communication with said control pressure passage, being effective to urge said secondary governor valve element to an inoperative position thereby inhibiting its modulating action and exhausting said governor pressure passage through its associated exhaust port.

4. In a compound governor valve assembly for establishing a pressure signal that is proportional in magnitude to the driven speed of a driven member when said driven speed is greater than a predetermined value, a governor valve body, a primary governor valve chamber and a secondary governor valve chamber formed in said valve body, primary and secondary governor valve elements disposed respectively in said primary valve chamber and said secondary valve chamber control pressure passage, a control pressure passage communicating with said primary governor valve chamber, a cross-over passage interconnecting said primary governor valve chamber and secondary governor valve chamber, an exhaust port formed in each valve chamber, means for biasing said primary governor valve element radially inwardly to a first operating position, said secondary governor valve element being adapted to shift radially outwardly under the influence of centrifugal force when the speed of rotation of said driven member reaches said predetermined value, said primary governor valve chamber establishing fluid communication between said control pressure passage and said cross-over passage when said primary governor valve element assumes a radially outward position, said cross-over passage being in fluid communication with its associated exhaust port when said primary governor valve element assumes a radially inward position, a governor pressure passage communicating with said secondary governor valve chamber, said secondary governor valve element being formed with a differential area that is in fluid communication with said governor pressure passage, and means for biasing said secondary governor valve element in a radially outward direction, said secondary governor valve element being adapted to modulate the pressure in said cross-over passage to produce a resultant pressure signal in said governor pressure passage that is proportional in magnitude to the driven speed of said driven member, said primary governor valve element being adapted to inhibit modulating action of said secondary governor valve element by exhausting said cross-over passage when the speed of rotatioin of said driven member is less than said predetermined value.

5. In a compound fluid pressure governor adapted to establish a pressure signal that is an indicator of the driven speed of a driven member, a valve body mounted for rotation with said driven member, a first valve chamber and a second valve chamber formed in said valve body, a primary governor valve element and a secondary governor valve element disposed respectively in said first and second valve chambers and adapted for radial shifting movement with respect to the axis of rotation of said driven member, a fluid pressure supply passage in fluid communication with said governor assembly, a governor pressure delivery passage communicating with said secondary valve chamber, said secondary governor valve element being formed with a differential area that is in fluid communication with said delivery passage, each valve element being adapted to be urged radially outwardly under the influence of centrifugal force, said secondary governor valve element being adapted to modulate the control pressure made available to said assembly to produce a resultant pressure signal in said governor pressure delivery passage that is proportional in magnitude to the driven speed of said driven member, a cross-over passage interconnecting portions of said primary governor valve chamber and portions of said secondary governor valve chamber whereby said primary governor valve element may influence the regulating characteristics of said secondary governor valve element by controlling distribution of pressure to said cross-over passage, and means for opposing radially outward movement of said primary governor valve element under the influence of centrifugal force, said primary governor valve element being adapted to establish distribution of control pressure through said primary governor valve chamber to said cross-over passage when it assumes one radial position and to exhaust said cross-over passage when it assumes another radial position, said primary governor valve chamber and said secondary governor valve chamber being situated in said valve body on opposite sides of said driven member thereby providing a dynamically balanced assembly.

6. In a compound fluid pressure governor adapted to establish a pressure signal that is an indicator of the driven speed of a driven member, a valve body mounted for rotation with said driven member, a first valve chamber and a second valve chamber formed in said valve body, a primary governor valve element and a secondary governor valve element disposed respectively in said first and second valve chambers and adapted for radial shifting movement with respect to the axis of rotation of said driven member, a fluid pressure supply passage in fluid communication with said governor assembly, a governor pressure delivery passage communicating with said secondary valve chamber, said secondary governor valve element being formed with a differential area that is in fluid communication with said delivery passage, each valve element being adapted to be urged radially outwardly under the influence of centrifugal force, said secondary governor valve element being adapted to modulate the control pressure made available to said assembly to produce a resultant pressure signal in said governor pressure delivery passage that is proportional in magnitude to the driven speed of said driven member, a cross-over passage interconnecting portions of said primary governor valve chamber and portions of said secondary governor valve chamber whereby said primary governor valve element may influence the regulating characteristics of said secondary governor valve element by controlling distribution of pressure to said cross-over passage, means for opposing radially outward movement of said primary governor valve element under the influence of centrifugal force, said primary governor valve element being adapted to establish distribution of control pressure through said primary governor valve chamber to said cross-over passage when it assumes one radial position and to exhaust said cross-over passage when it assumes another radial position, and a valve spring situated on the radially inward side of said secondary governor valve element for urging the latter in a radially outward direction, said primary governor valve chamber and said secondary governor valve chamber being situated in said valve body on opposite sides of said driven member thereby providing a dynamically balanced assembly.

7. In a compound governor valve assembly for use in establishing a pressure signal that is proportional in magnitude to the driven speed of a driven member, a valve body mounted upon said member and including therein a primary valve chamber and a secondary valve chamber, a primary valve element and a secondary valve element disposed respectively in said primary and secondary valve chambers, said secondary valve element having formed thereon a differential area, a control pressure passage means communicating with each valve chamber for distributing thereto a supply pressure, a cross-over passage communicating with each valve chamber, a governor pressure passage communicating with said secondary valve chamber at a location adjacent said differential area, an exhaust port formed in each valve chamber, said primary governor valve element being adapted to assume either of two radial positions, spring means for biasing said primary governor valve element radially inwardly whereby it is adapted to establish communication between said supply pressure passage and said cross-over passage, said primary valve element being moved outwardly under the influence of centrifugal force when the speed of rotation of said driven member reaches a predetermined value whereby it is adapted to establish communication between said cross-over passage and its associated exhaust port, said secondary governor valve element being adapted to modulate the pressure of said control pressure passage when said cross-over passage is exhausted thereby producing a resultant pressure signal in said governor pressure passage that is proportional in magnitude to the driven speed of said driven member, and a pressure area on said secondary governor valve element that is in communication with said cross-over passage, the pressure in said cross-over passage, when the latter is in communication with said control pressure passage, being effective to urge said secondary governor valve element to an inoperative position thereby inhibiting its modulating action and exhausting said governor pressure passage through its associated exhaust port, said primary governor valve chamber and said secondary governor valve chamber being situated in said valve body on opposite sides of said driven member thereby providing a dynamically balanced assembly.

8. In a compound governor valve assembly for establishing a pressure signal that is proportional in magnitude to the driven speed of a driven member when said driven speed is greater than a predetermined value, a governor valve body, a primary governor valve chamber and a secondary governor valve chamber formed in said valve body, primary and secondary governor valve elements disposed respectively in said primary valve chamber and said secondary valve chamber control pressure passage, a control pressure passage communicating with said primary governor valve chamber, a cross-over passage interconnecting said primary governor valve chamber and said secondary governor valve chamber, an exhaust port formed in each valve chamber, means for biasing said primary governor valve element radially inwardly to a first operating position, said secondary governor valve element being adapted to shift radially outwardly under the influence of centrifugal force when the speed of rotation of said driven member reaches said predetermined value, said primary governor valve chamber establishing fluid communication between said control pressure passage and said cross-over passage when said primary governor valve element assumes a radially outward position, said cross-over passage being in fluid communication with its associated exhaust port when said primary governor valve element assumes a radially inward position, a governor pressure passage communicating with said secondary governor valve chamber, said secondary valve element being formed with a differential area that is in fluid communication with said governor pressure passage, and means for biasing said secondary governor valve element in a radially outward direction, said secondary governor valve element being adapted to modulate the pressure in said cross-over passage to produce a resultant pressure signal in said governor pressure passage that is proportional in magnitude to the driven speed of said driven member, said primary governor valve element being adapted to inhibit modulating action of said secondary governor valve element by exhausting said cross-over passage when the speed of rotation of said driven member is less than said predetermined value, said primary governor valve chamber and said secondary governor valve chamber being situated in said valve body on opposite sides of said driven member thereby providing a dynamically balanced assembly.

References Cited
UNITED STATES PATENTS 3,048,184  8/1962  Duffy _____ 137—51
3,279,486  10/1966 Duffy et al. _____ 137—54

FRANK J. COHEN, *Primary Examiner.*

G. F. MAUTZ, *Assistant Examiner.*